United States Patent
Sasaki

(10) Patent No.: US 6,661,601 B2
(45) Date of Patent: Dec. 9, 2003

(54) CABINET STRUCTURE FOR A MAGNETIC TAPE RECORDER

(75) Inventor: Kazuo Sasaki, Takefu (JP)

(73) Assignee: Orion Electric Co., Ltd., Fukui (JP)

( * ) Notice: Subject to any disclaimer, the term of this patent is extended or adjusted under 35 U.S.C. 154(b) by 242 days.

(21) Appl. No.: 09/870,481

(22) Filed: Jun. 1, 2001

(65) Prior Publication Data

US 2001/0053039 A1 Dec. 20, 2001

(30) Foreign Application Priority Data

Jun. 9, 2000 (JP) ........................................ 2000-172948

(51) Int. Cl.[7] .......................... G11B 5/027; G11B 33/02
(52) U.S. Cl. ........................................ 360/84; 369/75.1
(58) Field of Search ................................. 360/84, 97.01, 360/97.02, 97.03; 361/683–686; 369/75.1, 75.2; 312/8.1, 9.1, 9.9, 242, 243, 263–264

(56) References Cited

U.S. PATENT DOCUMENTS 4,398,280 A * 8/1983 Ishigami et al. ............ 369/75.2
4,718,858 A * 1/1988 Godfrey et al. ............. 439/296

* cited by examiner

Primary Examiner—George J. Letscher
(74) Attorney, Agent, or Firm—Wenderoth, Lind & Ponack, L.L.P.

(57) ABSTRACT

Disclosed is a cabinet structure for a magnetic tape recorder having a rear-and-bottom structure to which a deck of the magnetic tape recorder is to be fixed. At least selected part or parts or the whole of the rear-and-bottom structure are of a sheet of metal capable of providing a shielding effect.

8 Claims, 5 Drawing Sheets

CABINET STRUCTURE FOR A MAGNETIC TAPE RECORDER

BACKGROUND OF THE INVENTION

1. Field of the Invention

The present invention relates to a cabinet structure for a magnetic tape recorder, and particularly to such a cabinet structure capable of providing a shielding effect.

2. Related Arts

The magnetic tape recorder is sensitive to exterior noise signals of high-frequency, such as electromagnetic wave produced by radio sets or hair dryers used in the vicinity of the magnetic tape recorder, allowing noise signals to appear in the pictures and sound reproduced on the screen. The cylinder unit installed in the deck of the magnetic tape recorder is very sensitive to such noise signals no matter how weak they may be in strength, causing a disturbance in reproduced pictures and sound.

To prevent such a disturbance the cylinder unit is equipped with a shield plate. FIG. 4 shows a conventional deck structure having a cylinder unit and surrounding electronics and electric parts enclosed with a relatively large shield plate "a". FIG. 5 shows another conventional deck structure in which: a shield plate "b" put behind a cylinder unit "c"; and another shield plated "d" is placed to protect some parts other than the cylinder unit. In both of such conventional deck structures the cylinder unit is located so remote from the rear plate of the cabinet that noise signals can hardly reach the cylinder unit.

Incidentally the deck of the magnetic tape recorder is grounded to the cabinet, which makes up one part of the electronic circuit. To make sure of the grounding it is necessary that the deck be connected to the cabinet with metal or springs. This requires an extra work.

In view of the above one object of the present invention is to provide a cabinet structure for a magnetic tape recorder, which makes it unnecessary to use extra shield plates and grounding means.

SUMMARY OF THE INVENTION

To attain this object a cabinet structure for a magnetic tape recorder according to the present invention comprises a rear-and-bottom structure to which the deck of the magnetic tape recorder is to be fixed, at least selected part or parts or the whole of the rear-and-bottom structure being of a sheet of metal capable of providing a shielding effect. With this arrangement the rear plate of the rear-and-bottom structure is behind the cylinder unit and the connectors and conductors connecting the cylinder unit to the associated signal processing circuit. Thus, the rear metal sheet can prevent the invasion of exterior noise signals into the cabinet. The whole of the rear-and-bottom structure is of a sheet of metal. No extra shield pate, therefore, is required. When occasions demand, the rear-and-bottom structure may have resin plates press-fitted in openings made in its rear plate for the purpose.

The rear-and-bottom structure may have hooks stamped out and raised from the bottom. The hooks can be caught by notches formed in the chassis of the deck, thereby putting the hooks in contact with the chassis. The hook may have take any shape so far as it has a resilience strong enough to allow the hook to apply a resilient force to the chassis, thereby assuring that the hook be put in contact with the chassis.

Specifically such hook may have an oblique end bent relative to its upright rise from the bottom of the rear-and-bottom structure, allowing the oblique end to be yieldingly bent by inserting in the notch formed in the chassis of the deck when the rear-and-bottom structure is fixed to the chassis of the deck.

Other objects and advantages of the present invention will be understood from the following description of a cabinet structure for a magnetic tape recorder according to one preferred embodiment of the present invention, which is shown in accompanying drawings.

DETAILED DESCRIPTION OF PREFERRED EMBODIMENT

Figure 1:
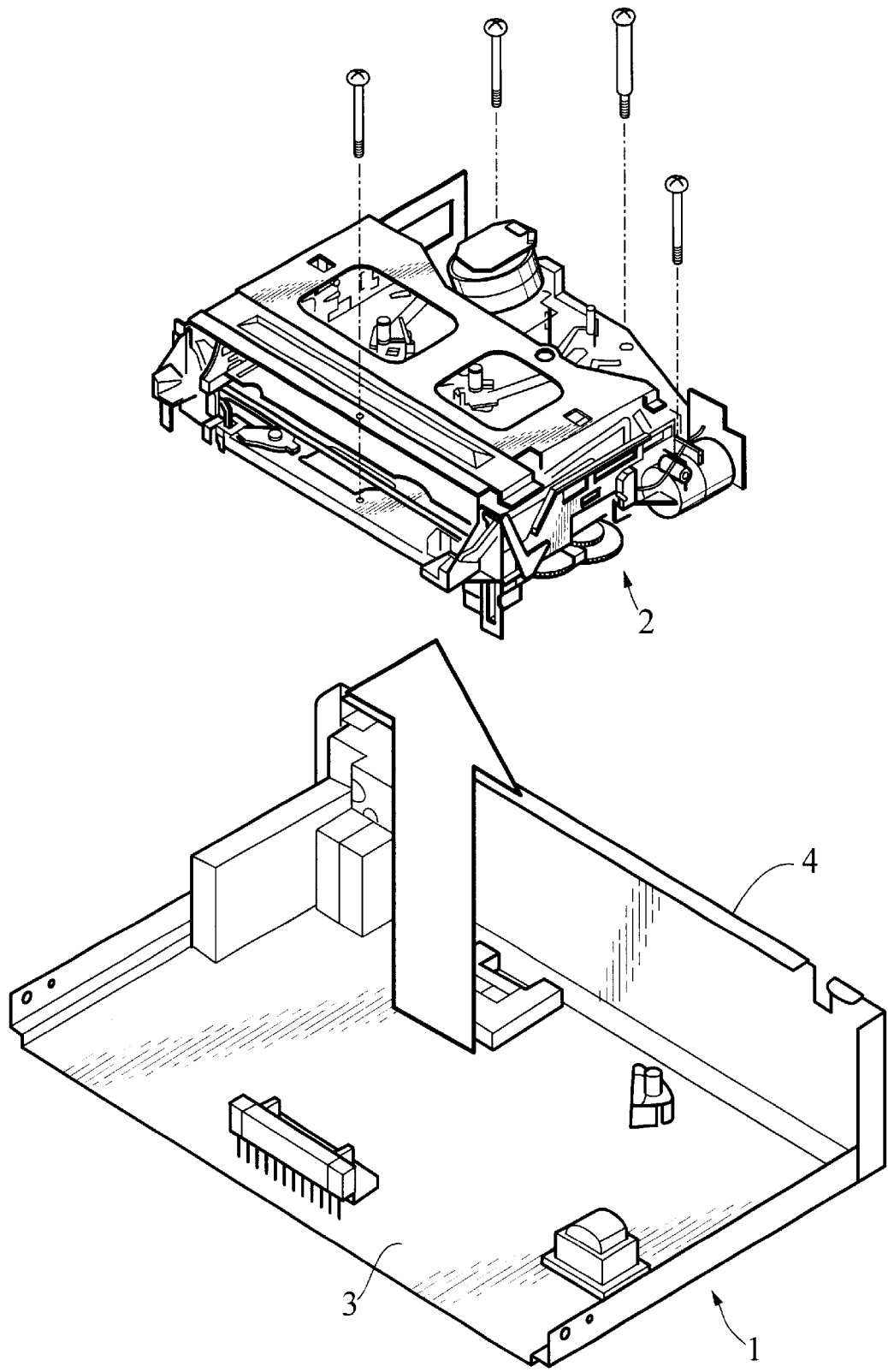
FIG. 1 is a perspective view of a deck of a magnetic tape recorder and a cabinet structure according to the present invention in the form of bottom frame.

FIG. 1 shows a bottom frame 1 constituting a cabinet according to one preferred embodiment of the present invention and a deck of a magnetic tape recorder. The bottom frame 1 is made of a sheet of metal, comprising a bottom plate 3 and a rear or back plate 4, which is bolted or welded to the bottom plate 3. The bottom frame 1 may be made by stamping out from a sheet of metal and by bending the stamped metal sheet into a rear-and-bottom structure. The stamped bottom frame 1 has a resin plate or plates press-fitted in selected openings of its rear part, although not shown in the drawing.

Figure 2:
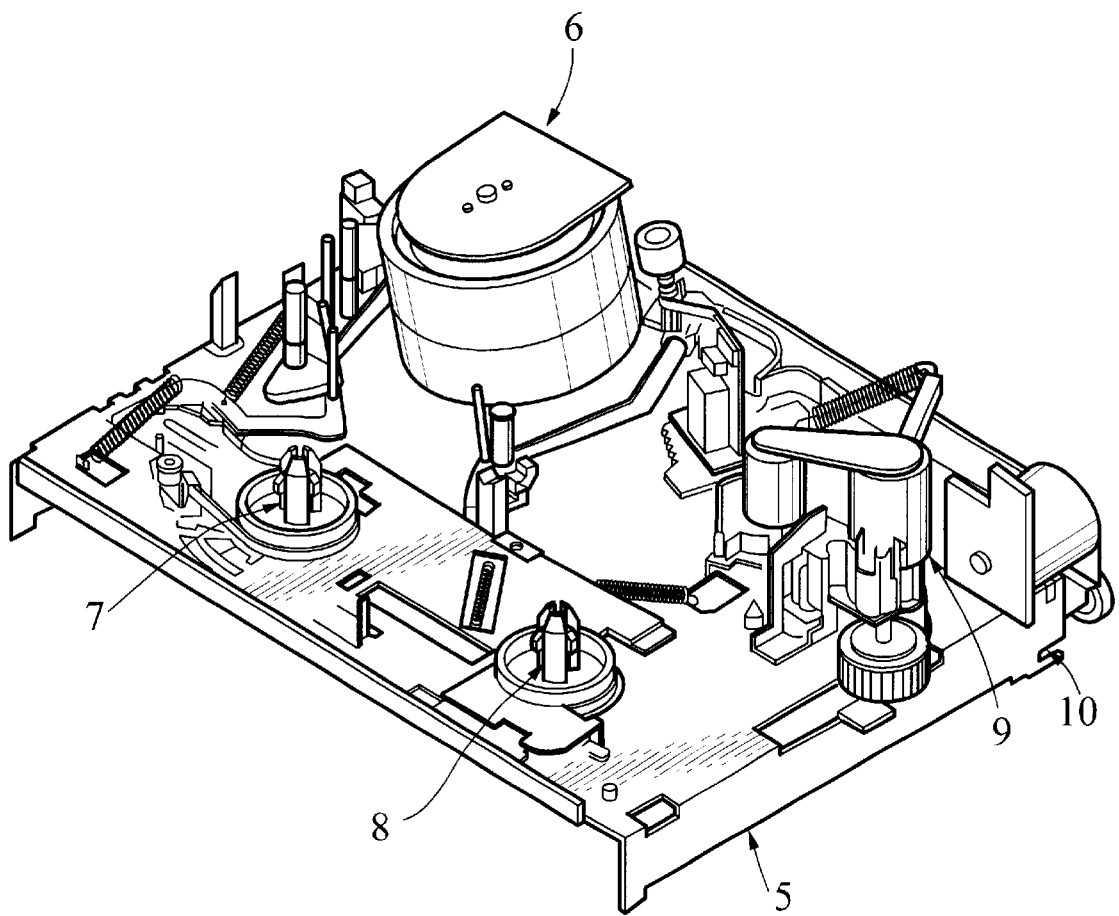
FIG. 2 is a perspective view of the deck having notches made in its edges.

A base plate having a plurality of electronics mounted thereon (not shown) is fixed to the bottom part of the bottom frame 1. The base plate has posts standing upright therefrom, and the deck 2 is fixed to the bottom frame 1 via such posts. FIG. 2 shows one example of such deck 2. As shown in the drawing, a cylinder unit 6, reels 7 and 8, a pinch roll block 9 and other parts are mounted on the chassis of the deck 2, but no shield plates for the cylinder unit 6 and other parts are mounted thereon.

The bottom frame 1 is of a sheet of metal, and the metal rear part 4 provides a shield to protect he cylinder unit and other parts against the exterior noise signals. As seen from FIG. 2, the chassis 5 has notches 10 formed on its rear side. The bottom plate 3 has hooks formed thereon to be caught by the notches 10 when the bottom plate 3 is applied to the chassis 5.

Figure 3A:
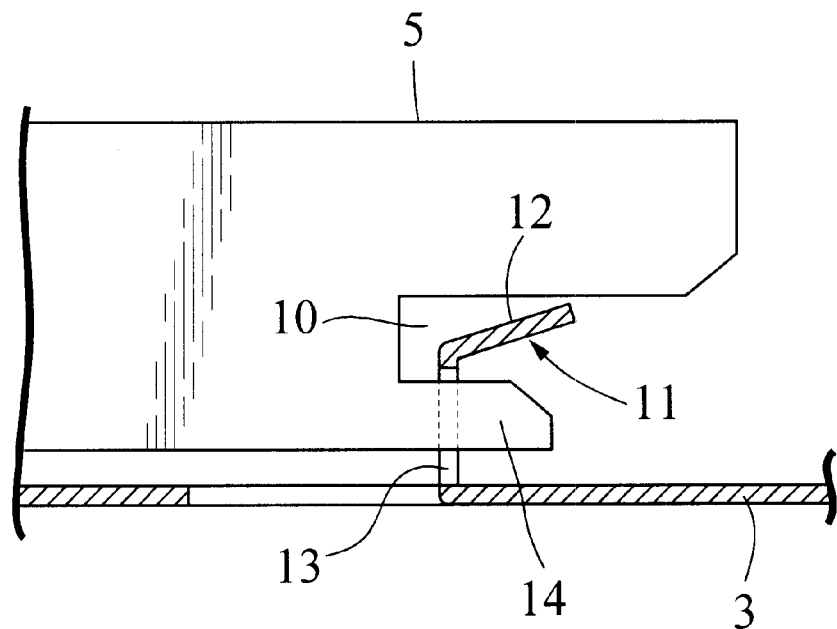
FIG. 3 shows how a selected hook rising from the bottom plate is caught by the notch formed in the chassis.
Figure 3B:
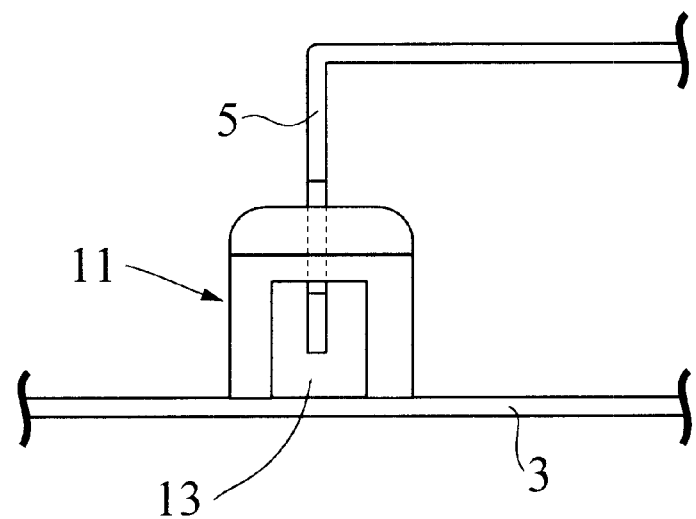
Figure 4:
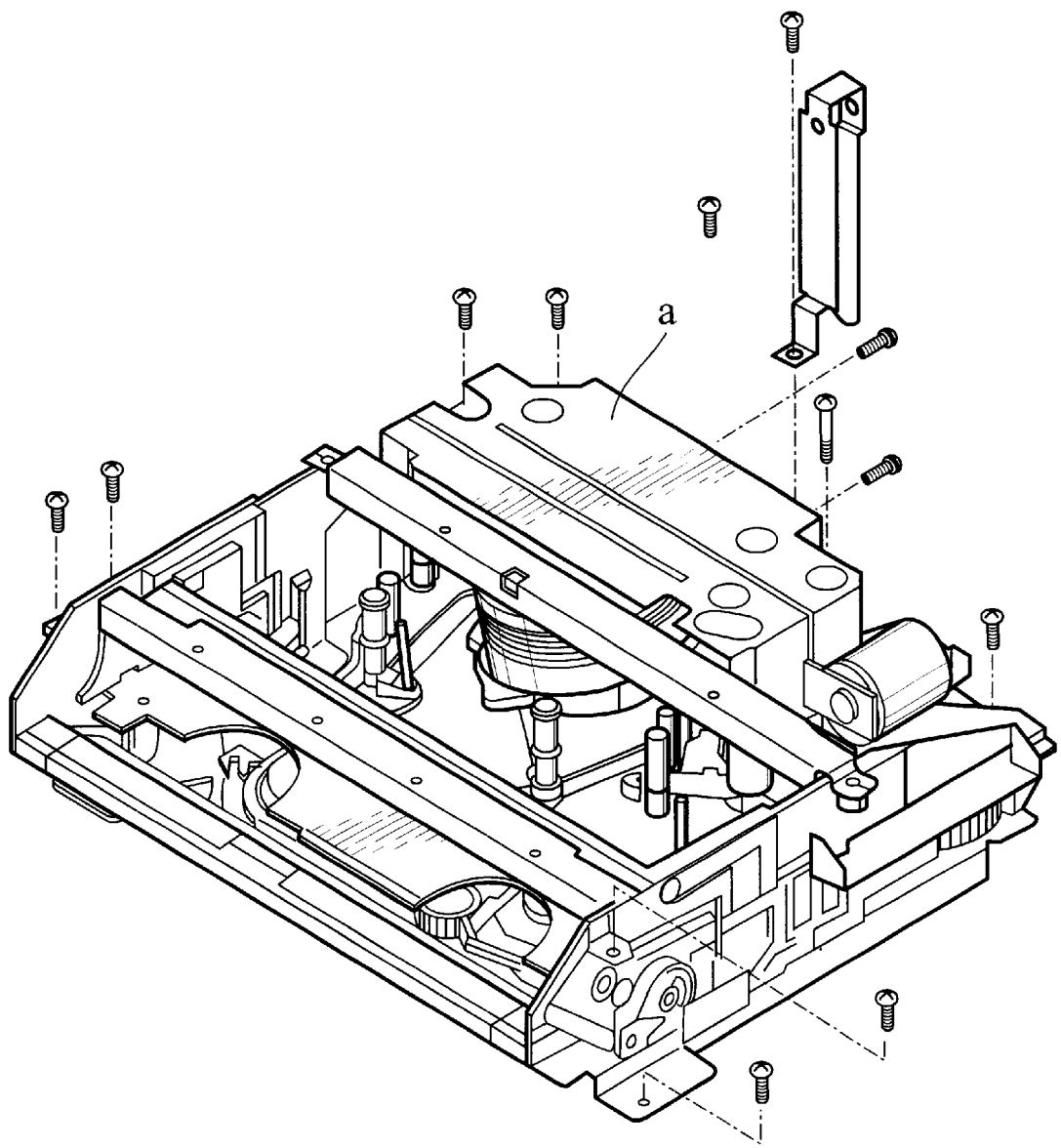
FIG. 4 is a perspective view of a conventional deck having shield plates equipped therewith.
Figure 5:
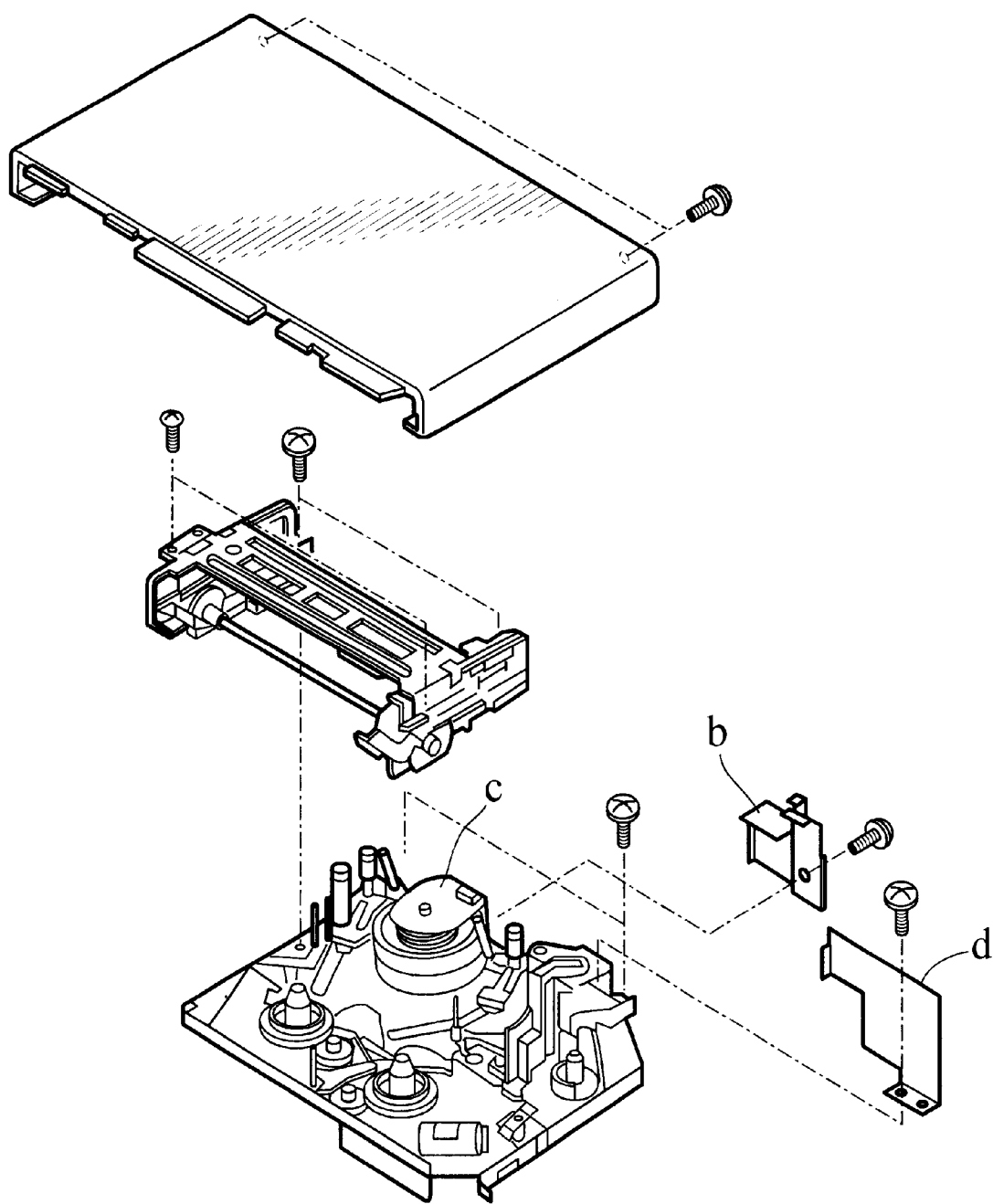
FIG. 5 is a perspective view of another conventional deck having different shield plates equipped therewith.

FIG. 3 shows how a selected hook 11 in the bottom plate 3 is caught by the notch 10 in the chassis 5 of the deck. The hook 11 is stamped out of the bottom plate 3. The stamped piece is raised, and its end is bent to be oblique relative to its upright leg. As shown in the drawing, the upright leg has a square opening made therein. The chassis has a rectangular cut 10 made on its edge, thus forming a projection 14 to be inserted in the square opening 13 of the hook 11.

Specifically the hook 11 is applied to the notch 10 by inserting the projection 14 in the square opening 13 of the hook 11 while making the oblique end of the hook 11 to be yieldingly bent, thereby assuring that the hook 11 be put in contact with the chassis 5. As a matter of course the bottom plate 3 can be fixed to the deck by using female nuts and male-threaded posts standing upright from the bottom plate 3.

As may be understood from the above, the cabinet structure according to the present invention is a stamped rear-and-bottom metal sheet effectively preventing the cylinder unit and other electronic or electric parts installed inside from exterior noise signals, thereby assuring that no noise signals appear in the recorded and reproduced pictures and sound.

The cabinet structure has hooks rising from its bottom plate, thus permitting the cabinet structure to be integrally fixed to the deck of the magnetic tape recorder by allowing the hooks to be caught by the notches. At the same time it is assured that the deck be grounded without requiring any extra deck-to-cabinet connecting means.

What is claimed is:

1. A cabinet structure for a magnetic tape recorder, comprising:

a rear-and-bottom structure to which a deck of the magnetic tape recorder is to be fixed, at least a selected part of said rear-and-bottom structure being constituted of a metal sheet capable of providing a shielding effect;

wherein said rear-and-bottom structure comprises a bottom part and hooks projecting upwardly from said bottom part, said hooks being arranged to engage in notches formed in a chassis of the deck of the magnetic tape recorder;

wherein each of said hooks includes an upright portion projecting up from said bottom part of said rear-and-bottom structure, and an oblique end portion extending from said upright portion and bent obliquely relative to said upright portion; and wherein each of said hooks comprises a resilient hook to allow said oblique end portion thereof to be yieldingly bent upon engaging in a respective one of the notches formed in the chassis of the deck of the magnetic tape recorder, and so as to cause said hooks to be reliably contacted with the chassis of the deck of magnetic tape recorder and to thereby cause the deck of the magnetic tape recorder to be grounded to said rear-and-bottom structure.

2. A cabinet structure according to claim 1, wherein said upright portion of each of said hooks has an opening formed therethrough to receive a projection portion of the chassis of the deck of the magnetic tape recorder that projects from below a respective one of the notches.

3. A cabinet structure according to claim 2, wherein each of said hooks is constituted by a stamped-out-and-raised-up portion of said bottom part of said rear-and-bottom structure, such that said bottom part has an opening therethrough directly adjacent said upright portion of each of said hooks.

4. A cabinet structure according to claim 3, wherein each of said hooks is constructed for engagement in one of the notches formed in the chassis of the deck of the magnetic tape recorder when the notches are formed so as to constitute generally horizontal slots when the deck is fixed on said rear-and-bottom structure.

5. A cabinet structure according to claim 2, wherein each of said hooks is constructed for engagement in one of the notches formed in the chassis of the deck of the magnetic tape recorder when the notches are formed so as to constitute generally horizontal slots when the deck is fixed on said rear-and-bottom structure.

6. A cabinet structure according to claim 4, wherein each of said hooks is constituted by a stamped-out-and-raised-up portion of said bottom part of said rear-and-bottom structure, such that said bottom part has an opening therethrough directly adjacent said upright portion of each of said hooks.

7. A cabinet structure according to claim 6, wherein each of said hooks is constructed for engagement in one of the notches formed in the chassis of the deck of the magnetic tape recorder when the notches are formed so as to constitute generally horizontal slots when the deck is fixed on said rear-and-bottom structure.

8. A cabinet structure according to claim 6, wherein each of said hooks is constructed for engagement in one of the notches formed in the chassis of the deck of the magnetic tape recorder when the notches are formed so as to constitute generally horizontal slots when the deck is fixed on said rear-and-bottom structure.

* * * * *